United States Patent
Harley et al.

(10) Patent No.: US 7,561,797 B1
(45) Date of Patent: Jul. 14, 2009

(54) OPTICAL SIGNAL TRANSMITTER WITH ACTIVE OPTICAL E-FIELD DEGRADATION

(75) Inventors: James Harley, Nepean (CA); Kim B. Roberts, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 518 days.

(21) Appl. No.: 11/362,756

(22) Filed: Feb. 28, 2006

Related U.S. Application Data (60) Provisional application No. 60/656,368, filed on Feb. 28, 2005.

(51) Int. Cl.
*H04B 10/08* (2006.01)
*H04B 10/04* (2006.01)

(52) U.S. Cl. ............... 398/26; 398/193; 398/194; 398/159

(58) Field of Classification Search .............. 398/26, 398/158, 193, 194, 195, 159, 29
See application file for complete search history.

(56) References Cited

U.S. PATENT DOCUMENTS 6,847,788 B2 * 1/2005 Nakajima et al. ........... 398/149

* cited by examiner

*Primary Examiner*—M. R. Sedighian
(74) *Attorney, Agent, or Firm*—Kent Daniels; Blake, Cassels & Graydon LLP (57) ABSTRACT

A method and system for controlling optical signal to noise ratio (OSNR) of an optical signal at a receiver end of an optical link. A multi-bit sample stream is generated using a compensation function adapted to compensate impairments of the optical link A digital noise signal is generated and added to the multi-bit sample stream, and the resulting signal used to generate a degraded optical signal, which is then transmitted through the optical link.

30 Claims, 5 Drawing Sheets

OPTICAL SIGNAL TRANSMITTER WITH ACTIVE OPTICAL E-FIELD DEGRADATION

CROSS-REFERENCE TO RELATED APPLICATIONS

This application claims benefit under 35 U.S.C. 119(e) from U.S. Provisional Patent Application Ser. No. 60/656, 368, entitled Optical Signal Transmitter Systems with Electronic Precompensation, which was filed on Feb. 28, 2005.

MICROFICHE APPENDIX

Not Applicable.

TECHNICAL FIELD

The present invention relates to optical signal transmitters for optical communications systems, and in particular to an optical signal transmitter with active optical e-field degradation.

BACKGROUND OF THE INVENTION

Figure 1A:
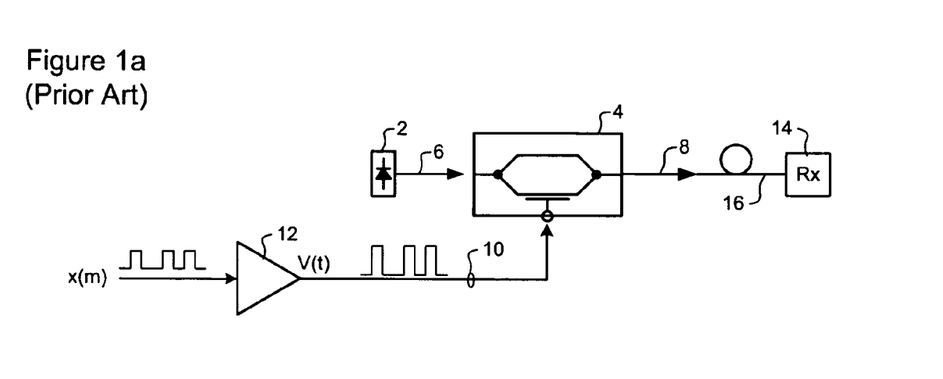
FIGS. 1a-1c schematically illustrate principal components and operation of a one-dimensional communications signal synthesizer known in the prior art.

In the optical communications space, various techniques are used to synthesize an optical communications signal for transmission. A popular technique utilizes a laser 2 coupled to an external optical modulator 4, as shown in FIG. 1a. The laser 2 generates a narrow-band continuous wave (CW) optical carrier signal 6 having a desired wavelength. The optical modulator 4 operates to modulate the amplitude and/or phase the carrier signal 6 to generate the optical communications signal 8 based on a drive signal 10 that encodes data to be transmitted. Typically, the drive signal 10 is generated by a driver circuit 12, which normally provides a power amplifier for amplifying the power of an input digital data signal x(m) to satisfy the input power requirements of the modulator 4.

In the arrangement illustrated in the FIG. 1a, the optical modulator 4 is provided by a well known Mach-Zehnder (MZ) interferometer. Other types of modulators may be used, depending on the desired type of modulation. For example, an electro-absorptive modulator (EAM) may be used for amplitude modulation; whereas phase modulators are well known for implementing phase modulation. In each case, the driver circuit 12 generates the drive signal 10 by scaling the input data signal x(t) to satisfy the voltage and current requirements of the modulator 4. The driver circuit 12 may also generate one or more bias signals (not shown) for controlling a bias point of the modulator 4 in a manner well known in the art.

Figure 1B:
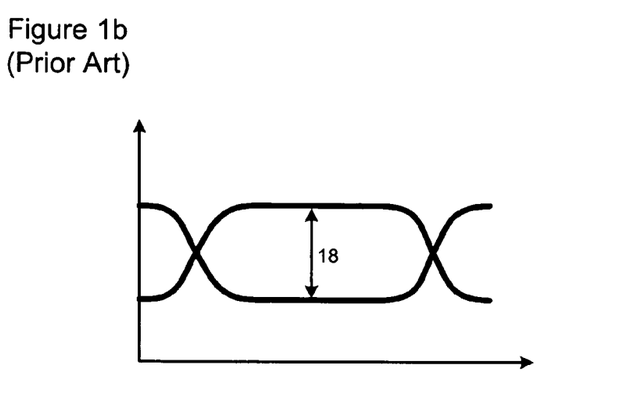
Figure 1C:
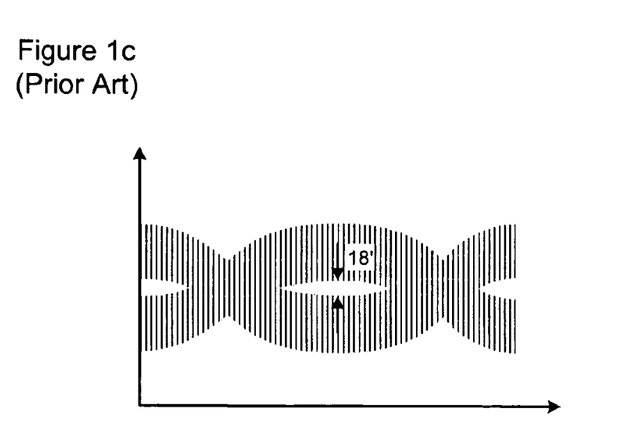

FIGS. 1b and 1c illustrate a typical eye-opening diagrams of the optical communications signal 8 at the output of the optical modulator 4 and at a receiver end 14 of an optical link 16, respectively. As may be seen in FIG. 1b, at the modulator output, the eye-opening 18 is dominated by the data modulation, with little if any noise, most of which is contributed by laser phase noise and signal leakage through the optical modulator 4. As the optical signal traverses the link 16, the optical signal power is attenuated due to absorption and incomplete amplification. At the same time, signal distortions accumulate due to residual (uncompensated) dispersion and PDL, as well as noise introduced by imperfect optical components (primarily the amplifiers) within the link 16. As a result, the optical signal at the receiver end 14 of the link 16 exhibits a comparatively narrow eye-opening 18', as a combined result of residual distortions and accumulated noise, as may be seen in FIG. 1c. Comparison between FIGS. 1b and 1c illustrates that the Optical Signal to Noise Ratio (OSNR) at the receiver end 14 of the link 16 is significantly lower than at the transmitter, and this typically holds true even for links with significant optical dispersion compensation and channel equalization devices within the link.

Figure 2A:
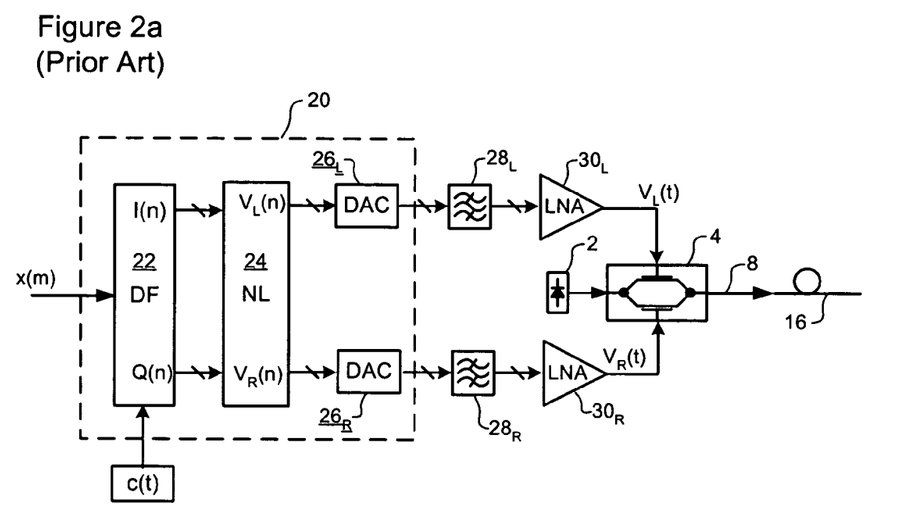
FIGS. 2a-2b schematically illustrate principal components of a complex optical synthesizer known from applicant's co-pending U.S. patent application Ser. No. 10/677,223 filed Oct. 3, 2003.

FIG. 2 illustrates an alternative arrangement known, for example, from Applicant's co-pending U.S. patent application Ser. No. 10/677,223 filed Oct. 3, 2003. In that system, a complex driver circuit 20 comprises a digital filter 22 which uses the input data signal x(m) and a compensation function c(t) to calculate multi-bit In-Phase and Quadrature component values I(n) and Q(n) of a target optical E-field modulation. A non-linear compensator 24 uses the I(n) and Q(n) components to compute multi-bit sample streams $V_R(n)$ and $V_L(n)$. These digital sample streams are then converted into corresponding analog voltage levels by respective multi-bit digital-to-analog converters (DACs) 26, filtered (at 28) to reduce out-of-band noise, and scaled by low noise amplifiers 30 to yield a pair of drive signals $V_R(t)$ and $V_L(t)$ which are supplied to respective branches of the MZ modulator 4. If desired, respective digital filters (not shown) may be positioned between the non-linear compensator 24 and the DACs 26 in order to compensate any propagation delay differences between the DACs 26 and the MZ modulator 4.

The arrangement of FIG. 2 is particularly advantageous in that the multi-bit sample values $V_R(n)$ and $V_L(n)$ can be computed taking into account non-linearities of the analog signal path (e.g. the DACs 26, filters 28 and LNAs 30) and the MZ modulator 4, such that the optical E-field of the composite signal 8 appearing at the output of the MZ modulator 4 closely matches the target E-field modulation computed by the digital filter 22. Additionally, the compensation function c(t) can be selected to compensate impairments of the optical link 16, in which case the target E-field modulation represents a pre-distorted signal which will be transformed by the link impairments into a substantially undistorted optical signal at a receiver end 14 of the link 16.

Figure 2B:
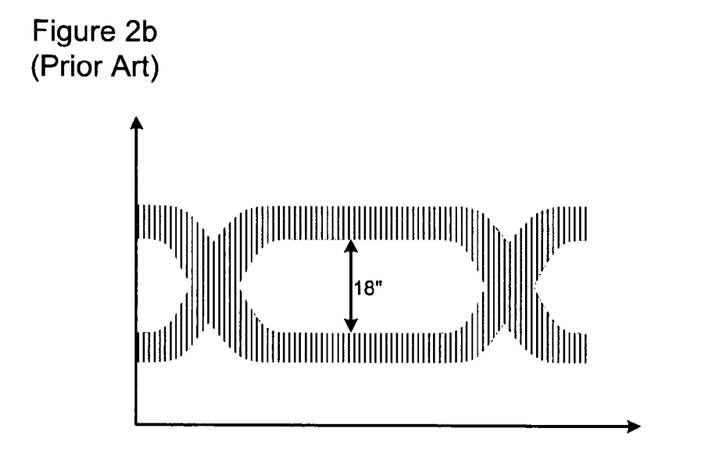

FIG. 2b illustrates the eye-opening of the optical signal at the receiver end 14 of the link 16. As noted above, distortions due to at least dispersion and polarization effects are substantially eliminated, leaving only amplifier (and other imperfect device) noise as the dominant noise contribution. The result is a wide eye-opening 18'' at the receiver end 14 of the link 16, as may be seen in FIG. 2b. In practice, an optical transmitter of the type illustrated in FIG. 2 has been shown to be capable of pre-compensating in excess of 30000 pS/nm of dispersion, as well as polarization dependent losses. In some implementations, the accuracy of pre-compensation is high enough to obtain a raw bit error rate (BER), that is, before Forward Error Correction (FEC), on the order of $10^{-12}$ using a conventional direct detection receiver.

Such a low raw BER exceeds the requirements of most optical transmission protocols (e.g., $10^{-9}$ for SONET), which, superficially at least, would appear to be a good thing. However, in practice the raw BER is used as a data input for various control processes used in the receiver. If the raw BER is too low, these control processes may drift to a sub-optimal condition due to a lack of input data.

Figure 3A:
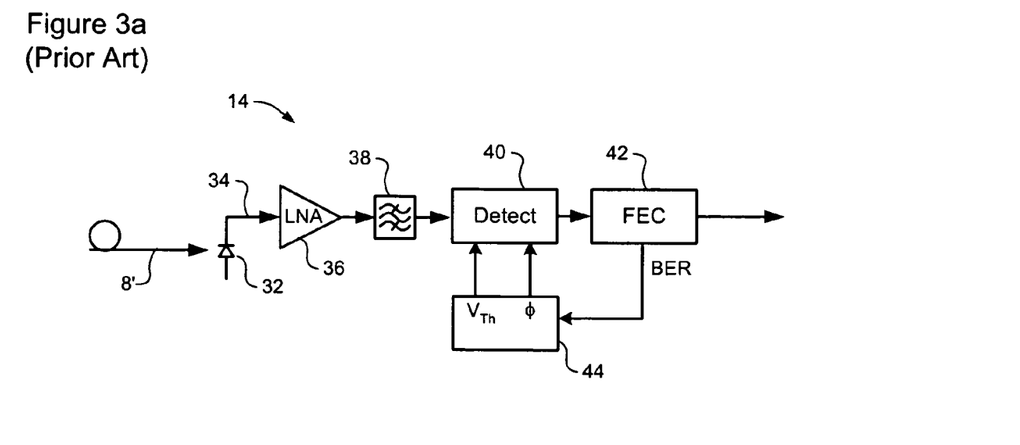
FIGS. 3a, 3b and 3c schematically illustrate principal components and operation of a direct detection receiver known in the prior art.

For example, FIG. 3a is a block diagram schematically illustrating a conventional direct detection receiver 14. As shown in FIG. 3a, an optical signal 8' received through the optical link 16 is made incident of a photodetector 32 to generate a corresponding analog electrical signal 34. The electrical signal 34 is then amplified (at 36) and filtered (at 38) to remove out-of-band noise, and then supplied to a detector circuit 40. In general, the detector circuit 40 operates as an analog-to-digital (A/D) converter, which compares the signal level to a slicing threshold $V_{Th}$, at a selected sample phase φ, to obtain a corresponding digital signal. A Forward Error Correction (FEC) circuit 42 then processes the digital signal in a known manner to correct errored data bits.

Figure 3B:
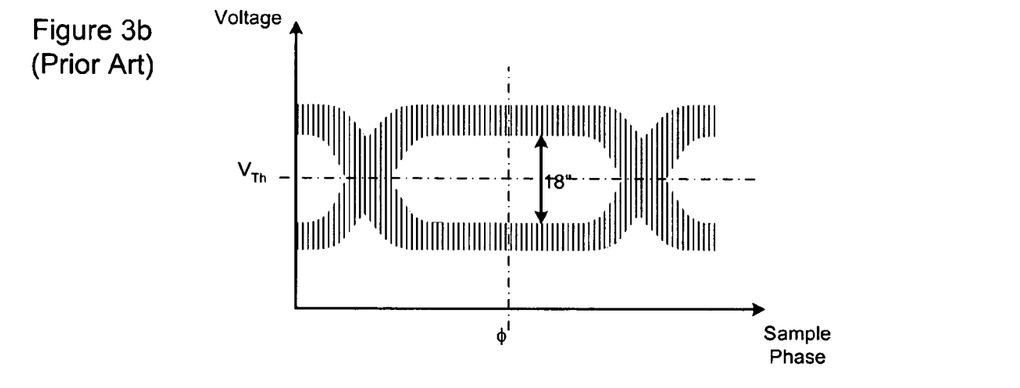
Figure 3C:
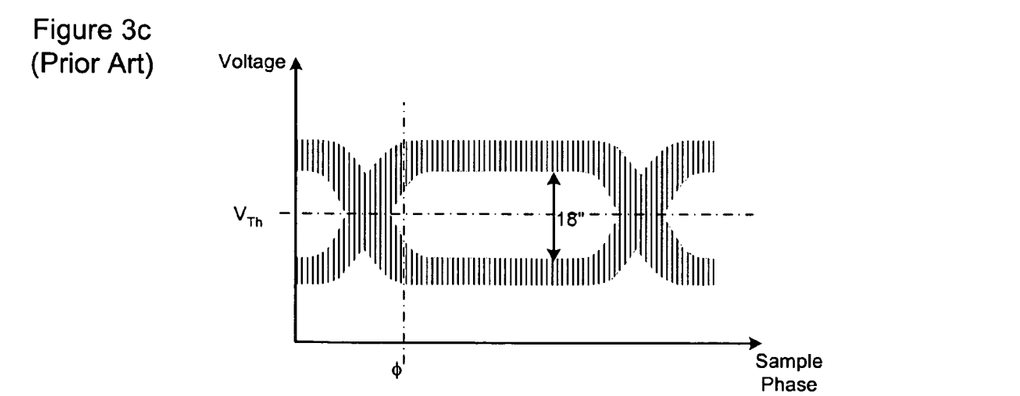

Typically, the slicing threshold $V_{Th}$ and sample phase $\phi$ are controlled on the basis of the raw BER detected by the FEC circuit 42. In general, a control loop 44 is implemented which adjusts the slicing threshold $V_{Th}$ and sample phase $\phi$ to optimize the BER, which normally results in the slicing threshold $V_{Th}$ and sample phase $\phi$ lying in the center of the eye-opening 18, as may be seen in FIG. 3b. However, if the raw BER is too low, the control loop 44 will have insufficient input data to accurately determine the actual sample phase $\phi$ of the detector circuit 40, and thus cannot make appropriate decisions as whether (and in which direction) the sample phase should be adjusted. For example, consider the above-noted case where the raw BER at the receiver 14 is on the order of $10^{-12}$. At a line rate of 10 Gbps, this translates into one errored bit every 1000 seconds. During that interval, the control loop 44 receives no input data, and thus makes no adjustments to the sample phase $\phi$. As a result, the sample phase $\phi$ can drift (undetectably) due to small differences between the data rate and the receiver's reference clock not shown. This normally results in the sample phase $\phi$ drifting to one end of the eye-opening, as may be seen in FIG. 3c, where the reduced signal-to-noise-ratio (SNR) raises the BER to a level at which the control loop 44 can function. While the detector 40 and FEC circuit 42 can recover digital data with the sample timing in this condition, the noise margin of the receiver 14 is significantly reduced. As a result, optical signal transients which increase the SNR can result in loss of data.

Accordingly, methods and apparatus enabling a BER-based control loops to function in the presence of an optical signal transmitter capable of reducing BER to extremely low levels remain highly desirable.

SUMMARY OF THE INVENTION

Accordingly, an object of the present invention is to provide methods and apparatus for controlling the signal to noise ratio (SNR) at a receiver end of an optical link.

Thus, an aspect of the present invention provides a method of controlling a signal to noise ratio of an optical signal at a receiver end of an optical link. A degraded optical signal is generated based on a compensation function adapted to compensate impairments of the optical link and a predetermined degradation function. The degraded optical signal is then transmitted through the optical link.

A further aspect of the present invention provides a method for controlling signal to noise ratio (OSNR) of an optical signal at a receiver end of an optical link. A multi-bit sample stream is generated using a compensation function adapted to compensate impairments of the optical link A digital noise signal is generated and combined with the multi-bit sample stream, and the resulting signal used to generate a degraded optical signal, which is then transmitted through the optical link.

The multi-bit sample stream produces a pre-distorted optical signal which is yields a substantially undistorted signal at the receiver end of the link. Insertion of the digital noise signal imposes a precisely controlled degradation of the optical E-field at the transmitter end of the link, which results in a controlled SNR (and thus BER) at the receiver.

BRIEF DESCRIPTION OF THE DRAWINGS

Further features and advantages of the present invention will become apparent from the following detailed description, taken in combination with the appended drawings, in which:

FIG. 5 schematically illustrates an optical link in which the present invention may be employed.

It will be noted that throughout the appended drawings, like features are identified by like reference numerals.

DETAILED DESCRIPTION OF THE PREFERRED EMBODIMENT

The present invention provides methods and apparatus for controlling signal to noise ratio (SNR) at a receiver end of an optical link. Embodiments of the invention are described below, by way of example only, with reference to FIGS. 4a-5.

Figure 4A:
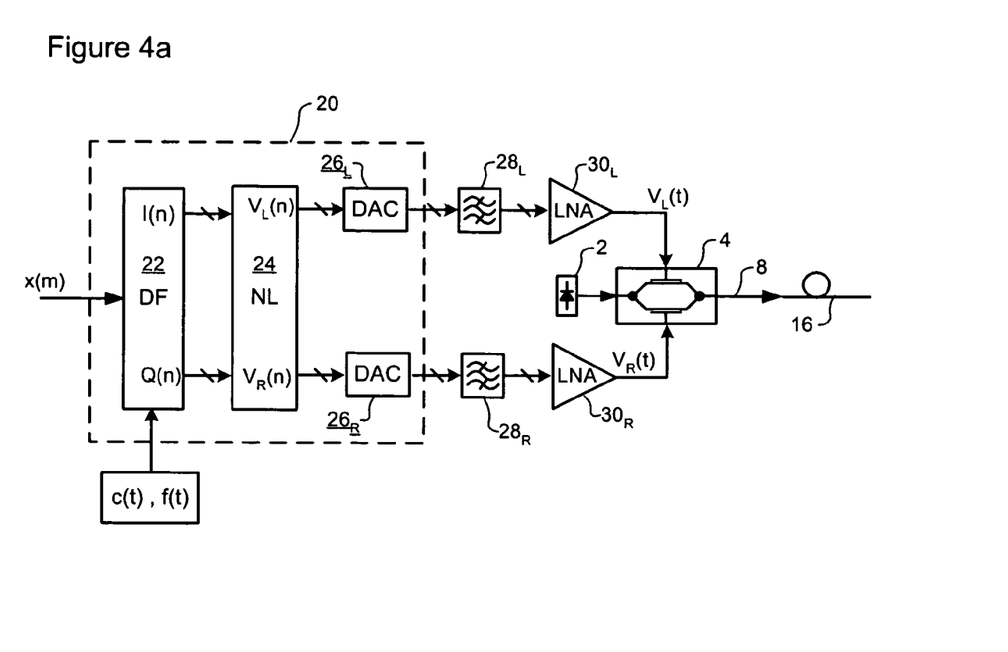
FIGS. 4a-4b schematically illustrate principal components and operation of a complex optical synthesizer in accordance with an embodiment of the present invention.
Figure 4B:
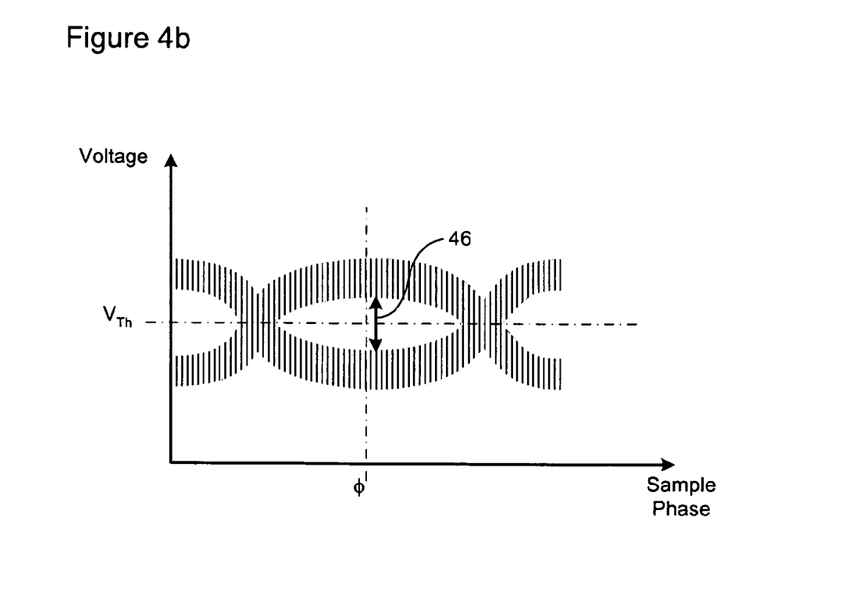
Figure 5A:
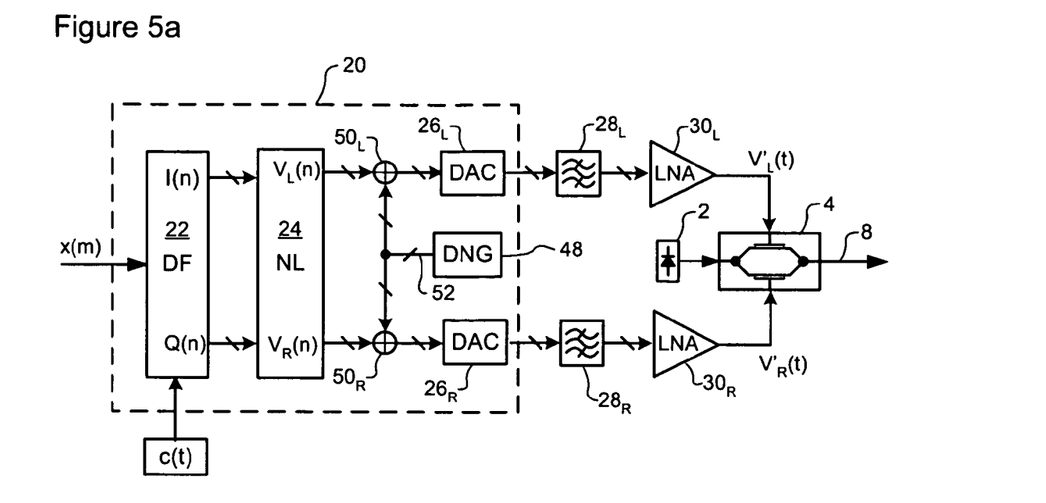
FIGS. 5a-5b schematically illustrate principal components and operation of a complex optical synthesizer in accordance with a second embodiment of the present invention.
Figure 5B:
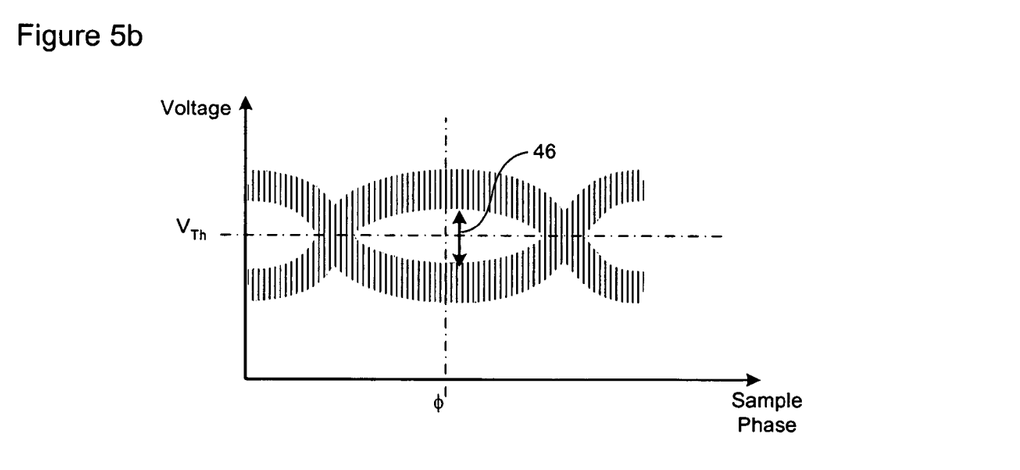

In general, the present invention leverages the precision pre-compensation capabilities of the transmitter known, for example, from Applicant's co-pending U.S. patent application Ser. No. 10/677,223, by applying a precisely controlled degradation function f(t) to the transmitted optical signal. The degradation function reduces the SNR at the receiver, increasing the raw Bit Error rate (BER) and thereby enabling proper operation of BER-based control functions. FIGS. 4 and 5 schematically illustrate representative embodiments of a system implementing this method.

In the embodiment of FIG. 4a, the degradation function f(t) is applied directly to the compensation function c(t) used to precompensate optical impairments of the optical link. In this case, the degradation function f(t) can be considered as a known error in the compensation function c(t), so that the optical signal at the receiver 14 retains a known amount of residual (uncompensated) distortion. In some embodiments, the degradation function f(t) may be provided as an offset of one or more link parameters. For example, consider a system in which the link dispersion is determined (e.g. by measurement using known methods) to be 10,000 pS/nm.

The degradation function f(t) may impose a dispersion offset of, for example, −500 pS/nm, so that the compensation function only compensates 10000−500=9500 pS/nm of dispersion. In this scenario, the optical signal will arrive at the receiver 14 with 10000−9500=500 pS/nm of residual dispersion. Similar effects can be obtained for other link parameters, such as polarization dependent loss and polarization mode dispersion. In all cases, however, the optical signal arriving at the receiver 14 contains residual distortions, corresponding to the degradation function f(t), which produces a "degraded" eye opening 46, as shown in FIG. 4b. This eye opening is referred to as "degraded", because it reflects the residual distortion, and is thus degraded from the optimal eye opening 18" that can be achieved with a "pure" compensation function c(t) as shown in FIG. 2b.

Because the residual optical signal distortions at the receiver 14 are the direct result of the degradation function f(t), it is possible to precisely control the eye-opening 46 to obtain a desired raw BER at the receiver 14.

If desired, the degradation function f(t) may be a constant value, or may vary in time. Thus, continuing the above example, a dispersion offset may be a fixed value (e.g. −500 pS/nm) or it may vary in time, e.g. following a square-wave, saw-tooth, or sinusoidal function. In the above examples, the degradation function f(t) is additive, in that an offset value is added to a link parameter. However, it is also possible to use a proportional degradation function, in which a link parameter is multiplied by the degradation function value.

Designing the degradation function f(t) as an offset to one or more link parameters is convenient from an implementation perspective, because it leverages the capacity of the transmitter to continuously adapt to changing link conditions. However, other forms of degradation function are possible. For example, the degradation function f(t) can impose an "error" in the compensation function c(t) itself. Such an error may take the form of an error in the amplitude and/or phase of the target optical E-field. FIG. 5 illustrates a further alternative embodiment, in which the degradation function f(t) is an error in either (or both) of the multi-bit the multi-bit sample streams $V_R(n)$ and $V_L(n)$.

In the embodiment of FIG. 5a, the complex driver circuit 20 of the optical transmitter includes a digital noise generator 48, and a respective digital combiner block in each signal path between the non-linear compensator 24 and the DACs 26. The digital noise generator 48 operates to generate a degradation signal 52 having a desired strength and spectral characteristics, in accordance with a desired degradation function f(t). The digital combine blocks then insert the degradation signal to the multi-bit sample streams $V_R(n)$ and $V_L(n)$. The resulting degraded sample streams are then processed through the DACs 20 and analog signal paths to yield degraded drive signals $V'_R(t)$ and $V'_L(t)$ which are used to modulate the carrier signal 6. The composite optical signal 8 generated at the modulator output thus exhibits a degradation of it's optical E-field, relative to the target E-field computed by the digital filter 22.

Various known methods may be used to implement the digital noise generator 48, provided only that the resulting degradation signal 52 possesses the desired characteristics. The degradation signal 52 may comprise any desired combination of amplitude and/or phase variations. The degradation signal 52 may be a single bit value or a multi-bit digital word, as desired. The magnitude of the degradation signal may be less than a Least Significant Bit (LSB) of the DACs 20, for example using the methods described in Applicant's copending U.S. patent application Ser. No. 11/008,515 filed Dec. 10, 2004. Preferably, the degradation signal is spectrally white, so that potentially harmful harmonics are avoided. The strength of the degradation signal may be constant or time varying, as described above, and/or may be selected based on a desired signal-to-noise ratio (SNR) or raw BER at the receiver.

Figure 6:
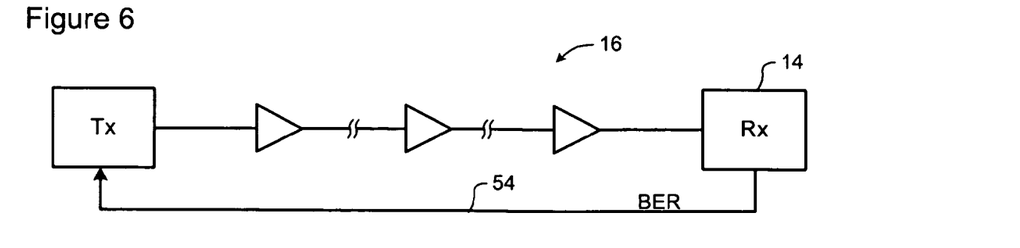

As described above, the digital filter 22 implements a compensation function c(t) which pre-compensates optical impairments of the optical link 16 and therefore strongly suppresses in-band noise at the receiver 14. The digital noise generator 48 and combiners 50 impose a precisely controlled degradation of the optical E-field at the modulator output. As a result, in-band noise (and thus SNR) at the receiver 14 will be dominated by the degradation signal 52. Since the strength of the degradation signal can be precisely controlled at the transmitter, it is therefore possible to control the SNR at the receiver 14, independently of the "naturally occurring" amplifier noise. This, in turn, enables the raw BER at the receiver 14 to actively controlled by the transmitter, for example using a feed-back loop 54 as illustrated in FIG. 6. Thus, for example, the raw BER measured by the receiver FEC circuit 42 can be transmitted (e.g. via a network control channel) back to the transmitter. The transmitter can then compare the received (measured) BER with a desired target BER, and adjust the strength of the degradation signal 52 based on the comparison result. The following scenarios illustrate some, but by no means all, of the ways in which this functionality can be exploited.

Scenario 1: BER-Based Control Loop Stability

In order to support operation of BER-based control loops 44, the raw BER detected at the receiver 14 (e.g. by the FEC circuit 42) should exceed a minimum threshold determined by the design of the involved control loops 44. At the same time, however, it is important that the BER not exceed the correction performance of the FEC circuit 42. The precision afforded by the present invention facilitates this operation. For example, consider a system in which the BER-based control loops 44 are designed on the assumption that the raw BER at the receiver will be at least $10^{-7}$; and in which the FEC circuit 42 is designed to achieve an output BER of $10^{-9}$ with a maximum raw BER of $10^{-5}$. In this case, the degradation function f(t) implemented by the transmitter can be controlled such that the raw BER at the receiver 14 is held constant at $10^{-6}$, for example. This means that the raw BER exceeds the minimum ($10^{-7}$) needed by the control loops 44 by an order of magnitude, while staying well within the FEC tolerance, again by an order of magnitude. Furthermore, the degradation function f(t) can easily be adjusted over time, so as to maintain the desired SNR and/or raw BER even as component aging alters the performance of the optical link 16 and receiver 14.

Scenario 2: SLAT

During System Layout and Test (SLAT), it is desirable to be able to strongly suppress in-band noise so as to enable the transmitter and receiver to establish signal continuity, and to train the digital filter 22 (That is, the compensation function-c(t)) to the link impairments. Once these steps have been accomplished, however, a controlled amount of in-band noise is useful to support BER-based control loops 44 within the receiver 14, as described above.

As will be appreciated, this operation is easily achieved using the system of the present invention, by the mere expedient of disabling the degradation function f(t) (e.g. by disabling the digital noise generator 48 or otherwise setting the strength to zero) during continuity testing and training. Once these steps have been successfully completed, the degradation function f(t) can be enabled to support operation of the BER-based control loops 44.

A variation of this operation is to progressively increase the strength of the degradation function f(t). Thus, for example, at the end of continuity testing and training, the strength of the degradation function f(t) may be increased gradually from zero (e.g. in a step-wise manner). This operation enables each BER-based control loop 44 to converge to an optimum control point of its respective control surface. Once this has been done, the degradation function f(t) can be adjusted to a level needed to support both the continuing operation of the BER-based control loops and FEC.

Scenario 3: Factory Test

As is well known in the art, random or pseudo-random signals and white noise are often used for factory testing of high-speed communications systems. Typically, these signals are provided by means of sophisticated (and expensive) signal generators, which must be connected to the system under test. Thus for example, a communications system may be tested by transmitting a pseudo-random bit sequence, while white noise (e.g. simulating one or more optical amplifiers) is optically added to the link. The digital noise generator 48 of the present invention provides an "on-chip" white noise generator, which means that both signal components can be handled by the transmitter, and the need for a separate signal generator is eliminated. Such an on-chip signal generator is "free", in the sense that it is incorporated into the chip for use during run-time rather than being dedicated to factory test functions.

Scenario 4: In-band SNR Measurement

As is known in the art, in-band SNR is typically estimated by assuming that the noise floor extends linearly through the data-band. Thus, noise power level measurements made at the edges of the optical signal are extrapolated into the optical band for comparison with the measured signal power. The methods and systems of the present invention provide a method of directly measuring in-band SNR and noise margin. In-band SNR is directly proportional to the raw BER, which is continuously being measured but the FEC circuit 42, and actively controlled by the transmitter. In-band noise margin is proportional to the sensitivity of raw BER to changes in the in-band SNR, which can be measured by dithering the strength of the degradation function f(t) and tracking corresponding changes in the raw BER.

If desired, the raw BER for a given degradation function f(t) may be sampled and stored at periodic intervals. Equivalently, the degradation function strength required to obtain a desired raw BER value may be stored. In either case, the stored values can be accumulated over time and used to conduct trend analysis to detect changes in the link performance as a function of time. This operation may be useful in monitoring effects of component aging, and possibly even for detecting imminent link failures.

The embodiment(s) of the invention described above is(are) intended to be representative only. The scope of the invention is therefore intended to be limited solely by the scope of the appended claims.

We claim:

1. A method of controlling a signal to noise ratio of an optical signal at a receiver end of an optical link, the method comprising steps of:
   generating a degraded optical signal based on a compensation function adapted to compensate impairments of the optical link and a predetermined degradation function for producing a predetermined residual distortion in the optical signal at the receiver end of the optical link; and
   transmitting the degraded optical signal through the optical link.

2. A method as claimed in claim 1, wherein the degradation function is substantially constant in time.

3. A method as claimed in claim 1, wherein the degradation function varies in time.

4. A method as claimed in claim 1, wherein the degradation function comprises a predetermined error of the compensation function.

5. A method as claimed in claim 4, wherein the predetermined error comprises an offset of either one or both of: a chromatic dispersion parameter; and a polarization mode dispersion parameter.

6. A method as claimed in claim 1, wherein the step of generating a degraded optical signal comprises steps of:
   generating a multi-bit sample stream using the compensation function;
   applying the degradation function to the sample stream; and
   generating a degraded optical signal based on the degradation function result.

7. A method as claimed in claim 6, wherein the step of applying a degradation function to the sample stream comprises steps of:
   generating a degradation signal; and
   applying the degradation signal to the multi-bit sample stream.

8. A method as claimed in claim 7, wherein the degradation signal comprises variations in either one or both of phase and amplitude.

9. A method as claimed in claim 7, wherein the degradation signal is spectrally white.

10. A method as claimed in claim 7, wherein the step of applying the degradation signal to the multi-bit sample stream comprises a step of adding the degradation signal to the sample stream.

11. A method as claimed in claim 7, wherein the step of applying the degradation signal to the multi-bit sample stream comprises a step of multiplying the sample stream by the degradation signal.

12. A method as claimed in claim 1, further comprising a step of controlling a strength of the degradation function based on a desired Bit Error Rate (BER) at the receiver end of the link.

13. A method as claimed in claim 12, wherein the step of controlling the strength of the degradation function comprises steps of:
   receiving a measured BER value from a receiver;
   comparing the measured BER value to the desired BER value; and
   adjusting the strength based on the comparison result.

14. A method as claimed in claim 12, wherein the desired BER value is based on either one or both of: a design of a BER-based control loop of the receiver; and a BER tolerance of a Forward Error Correction (FEC) circuit of the receiver.

15. A method as claimed in claim 12, wherein the step of controlling the strength of the degradation function comprises steps of:
   setting the strength to zero during a continuity testing and training mode; and
   increasing the strength following completion of continuity testing and training.

16. A method as claimed in claim 15, wherein the step of setting the strength to zero comprises a step of disabling generation of a degradation signal.

17. A method as claimed in claim 16, wherein the step of increasing the strength comprises a step of re-enabling generation of the degradation signal.

18. A method as claimed in claim 16, wherein the step of increasing the strength comprises a step of progressively increasing the strength until at least one BER-based control loop of a receiver converges to an optimum control point.

19. A method as claimed in claim 18, comprising a further step of adjusting the strength based on a BER tolerance of a Forward Error Correction (FEC) circuit of the receiver.

20. A system for controlling a signal to noise ratio of an optical signal at a receiver end of an optical link, the system comprising:
- an optical signal generator for generating a degraded optical signal based on a compensation function adapted to compensate impairments of the optical link and a predetermined degradation function for producing a predetermined residual distortion in the optical signal at the receiver end of the optical link; and
- means for transmitting the degraded optical signal through the optical link.

21. A system as claimed in claim 20, wherein the degradation function is substantially constant in time.

22. A system as claimed in claim 20, wherein the degradation function varies in time.

23. A system as claimed in claim 20, wherein the degradation function comprises a predetermined error of the compensation function.

24. A system as claimed in claim 23, wherein the predetermined error comprises an offset of either one or both of: a chromatic dispersion parameter; and a polarization mode dispersion parameter.

25. A system as claimed in claim 20, wherein the optical signal generator comprises:
- a digital filter for generating a multi-bit sample stream using the compensation function;
- means for applying the degradation function to the sample stream; and
- an optical modulator for generating the degraded optical signal based on the degradation function result.

26. A system as claimed in claim 25, wherein the means for applying the degradation function to the sample stream comprises steps of:
- a digital noise generator for generating a degradation signal; and
- a combiner block for applying the degradation signal to the multi-bit sample stream.

27. A system as claimed in claim 26, wherein the degradation signal comprises variations in either one or both of phase and amplitude.

28. A system as claimed in claim 26, wherein the degradation signal is spectrally white.

29. A system as claimed in claim 26, wherein the combiner block comprises a digital adder for adding the degradation signal to the sample stream.

30. A system as claimed in claim 26, wherein the combiner block comprises a digital multiplier for multiplying the sample stream by the offset value.

* * * * *